(12) United States Patent
Iwasaki (10) Patent No.: US 7,952,299 B2
(45) Date of Patent: May 31, 2011

(54) CONTROL CIRCUIT AND METHOD FOR SELF-EXCITING CAPACITOR CHARGING CIRCUIT

(75) Inventor: Tatsuya Iwasaki, Kyoto (JP)

(73) Assignee: Rohm Co., Ltd. (JP)

( * ) Notice: Subject to any disclaimer, the term of this patent is extended or adjusted under 35 U.S.C. 154(b) by 412 days.

(21) Appl. No.: 12/248,279

(22) Filed: Oct. 9, 2008

(65) Prior Publication Data
US 2009/0102395 A1     Apr. 23, 2009

(30) Foreign Application Priority Data
Oct. 10, 2007   (JP) ................................ 2007-264451

(51) Int. Cl.
*H05B 37/00* (2006.01)
(52) U.S. Cl. ...... 315/291; 315/219; 315/224; 315/227 R
(58) Field of Classification Search .................. 315/291, 315/219, 224, 307, 308, 227 R, 239, 240, 315/241 R, 242, 243
See application file for complete search history.

(56) References Cited

U.S. PATENT DOCUMENTS
6,674,247 B1 * 1/2004 Mead et al. ................ 315/241 P
7,397,194 B2 * 7/2008 Garbowicz et al. ............. 315/86
7,847,486 B2 * 12/2010 Ng ................................ 315/119

FOREIGN PATENT DOCUMENTS
| JP | 2004-201474 | 7/2004 |
|---|---|---|
| JP | 2005-073483 | 3/2005 |
| JP | 2007-165002 | 6/2007 |
| JP | 2007-166786 | 6/2007 |

* cited by examiner

*Primary Examiner* — David Hung Vu
(74) *Attorney, Agent, or Firm* — Cantor Colburn LLP (57) ABSTRACT

A first voltage comparator makes a comparison between a first detection voltage that occurs at one terminal of a first resistor and a predetermined first threshold voltage. A second voltage comparator compares a second detection voltage that occurs at one terminal of a second resistor with a predetermined second threshold voltage. A logic unit generates a switching signal, the level of which is switched according to the output signals of the first voltage comparator and the second voltage comparator, and outputs the switching signal thus generated to the gate of a switching transistor. After a predetermined period of time elapses after the switching signal is switched to the level which turns off the switching transistor, an automatic restart circuit forcibly switches the switching signal to a level which switches the switching transistor to the ON state.

8 Claims, 5 Drawing Sheets

CONTROL CIRCUIT AND METHOD FOR SELF-EXCITING CAPACITOR CHARGING CIRCUIT

BACKGROUND OF THE INVENTION

1. Field of the Invention

The present invention relates to a capacitor charging circuit, and particularly to a control method for a self-exciting capacitor charging circuit.

2. Description of the Related Art

For the purpose of generating higher voltage than the input voltage, step-up capacitor charging circuits are widely used in various electronic devices. Such a step-up capacitor charging circuit includes a switching element and an inductor or a transformer. With such an arrangement, the switching element is turned on and off in a time divisional manner so as to generate back electromotive force in the inductor or the transformer, thereby boosting the input voltage, and outputting the voltage thus stepped up.

When a switching transistor is turned off, an electric current flows through the primary winding of the transformer, thereby storing energy in the transformer. When the switching transistor is turned off, the energy thus stored in the transformer is transferred to an output capacitor in the form of a charging current via a rectifier diode in the secondary winding, thereby raising the output voltage. After the transfer of the energy stored in the transformer to the output capacitor, the current that flows through the rectifier diode becomes zero.

As a method for controlling an insulated-type capacitor charging circuit, a self-exciting control method without involving an oscillator is known, whereby the primary winding or the secondary winding of a transformer is monitored, and the ON/OFF control operation for the switching transistor is performed according to the state thus monitored.

PATENT DOCUMENT 1

Japanese Patent Application Laid Open No. 2004-201474

PATENT DOCUMENT 2

Japanese Patent Application Laid Open No. 2005-73483

PATENT DOCUMENT 3

Japanese Patent Application Laid Open No. 2007-165002

PATENT DOCUMENT 4

Japanese Patent Application Laid Open No. 2007-166786

Now, as a control method for a self-exciting DC/DC converter, let us consider a control method whereby the current that flows through the primary winding of the transformer and the current that flows through the secondary winding thereof are monitored, the switching transistor is turned on at a timing at which the current (secondary current) that flows through the secondary winding becomes a predetermined level around zero, and the switching transistor is turned off after the current (primary current) that flows through the primary winding reaches a predetermined level.

In some cases, in order to compare the secondary current with a threshold value, a detection resistor is provided on a path to the secondary coil of the transformer, and the voltage drop that occurs in the detection resistor is compared with the threshold voltage. With such an arrangement, in a case in which a disturbance such as noise has occurred in a comparator which makes a comparison between voltages, in some cases, such an arrangement cannot detect the secondary current with high precision. As a result, the switching element cannot be turned on again, leading to an unexpected interruption of the charging operation of the capacitor. Such a problem can also occur in an arrangement in which the secondary current is compared with a threshold value using other methods.

SUMMARY OF THE INVENTION

The present invention has been made in view of such problems. Accordingly, it is a general purpose of the present invention to provide a function of preventing the charging operation of a capacitor charging circuit from unexpectedly being interrupted.

An embodiment of the present invention relates to a control circuit which controls the ON/OFF operation of a switching transistor provided on a path to a primary coil of a transformer of a self-exciting capacitor charging circuit. The control circuit includes: a first voltage comparator which compares the voltage drop that occurs at a first resistor provided on a path for a current which flows through the primary coil of the transformer, with a predetermined first threshold voltage; a second voltage comparator which compares the voltage drop that occurs at a second resistor provided on a path for a current which flows through a secondary coil of the transformer, with a predetermined second threshold voltage; a switching control unit which generates a switching signal the level of which is switched according to the output signals of the first and second voltage comparators, and which outputs the switching signal thus generated to a control terminal of the switching transistor; and an automatic restart circuit configured such that, after a predetermined period of time elapses after the switching signal is switched to a level which turns off the switching transistor, the switching signal is forcibly switched to a level which turns on the switching transistor.

With such an embodiment, even in a case in which the second voltage comparator cannot detect the secondary current, the switching transistor is switched to the ON state after a predetermined period of time elapses. Thus, such an embodiment prevents the switching operation from being interrupted.

Also, the capacitor charging circuit may further include a full-charge detection circuit which compares the output voltage of the capacitor charging circuit with a third threshold voltage, and which is configured such that, in a case in which the output voltage is greater than the third threshold voltage, the automatic restart circuit is set to the inactive state.

There is no need to continue the switching operation in the fully charged state. With such an arrangement, the unnecessary switching operation is prevented.

Also, the automatic restart circuit may include: a capacitor with one terminal being set to a fixed voltage; a current source which supplies a current to the capacitor; a first charging circuit configured such that, when the switching signal is at a level which turns on the switching transistor, the capacitor is discharged; and a comparator which compares the voltage at the other terminal of the capacitor with a predetermined fourth threshold voltage. With such an arrangement, according to the output of the comparator, the switching signal is forcibly switched to the level which turns on the switching transistor.

Also, the automatic restart circuit may further include a second discharge circuit configured such that, when the output voltage is greater than the third threshold voltage, the capacitor is discharged.

With such an arrangement, in a case in which the output voltage is greater than the third threshold voltage, the automatic restart circuit is set to the inactive state.

Another embodiment of the present invention relates to a capacitor charging circuit. The capacitor charging circuit includes an output circuit and the above-described control circuit. The output circuit includes a transformer, a switching transistor connected to a primary winding of the transformer, and an output capacitor provided to a secondary winding of the transformer, and performs the ON/OFF operation of the switching transistor so as to charge the output capacitor. The control circuit controls the ON/OFF operation of the switching transistor.

Yet another embodiment of the present invention relates to an electronic device. The electronic device includes: the above-described capacitor charging circuit; an image capturing unit; and a light emitting element which is driven by the output voltage of the capacitor charging circuit, and which is used as a flash in image acquisition performed by the image capturing unit.

Yet another embodiment of the present invention relates to a method for controlling the ON/OFF operation of a switching transistor of a self-exciting capacitor charging circuit. The method includes: comparing a primary current that flows through a primary coil of a transformer with a predetermined first threshold value, and switching the switching transistor to the OFF state when the primary current exceeds the first threshold value; comparing a secondary current that flows through a secondary coil of the transformer with a predetermined second threshold value, and switching the switching transistor to the ON state when the secondary current drops to the second threshold value; and forcibly switching the switching transistor to the ON state after a predetermined period of time elapses after the switching transistor is switched to the OFF state.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

As necessary, in the following description in the present specification, the reference numerals that denote a voltage signal, a current signal, a resistor, and a capacitor also represent the voltage value, the current value, the resistance, and the capacitance, respectively.

Figure 1:
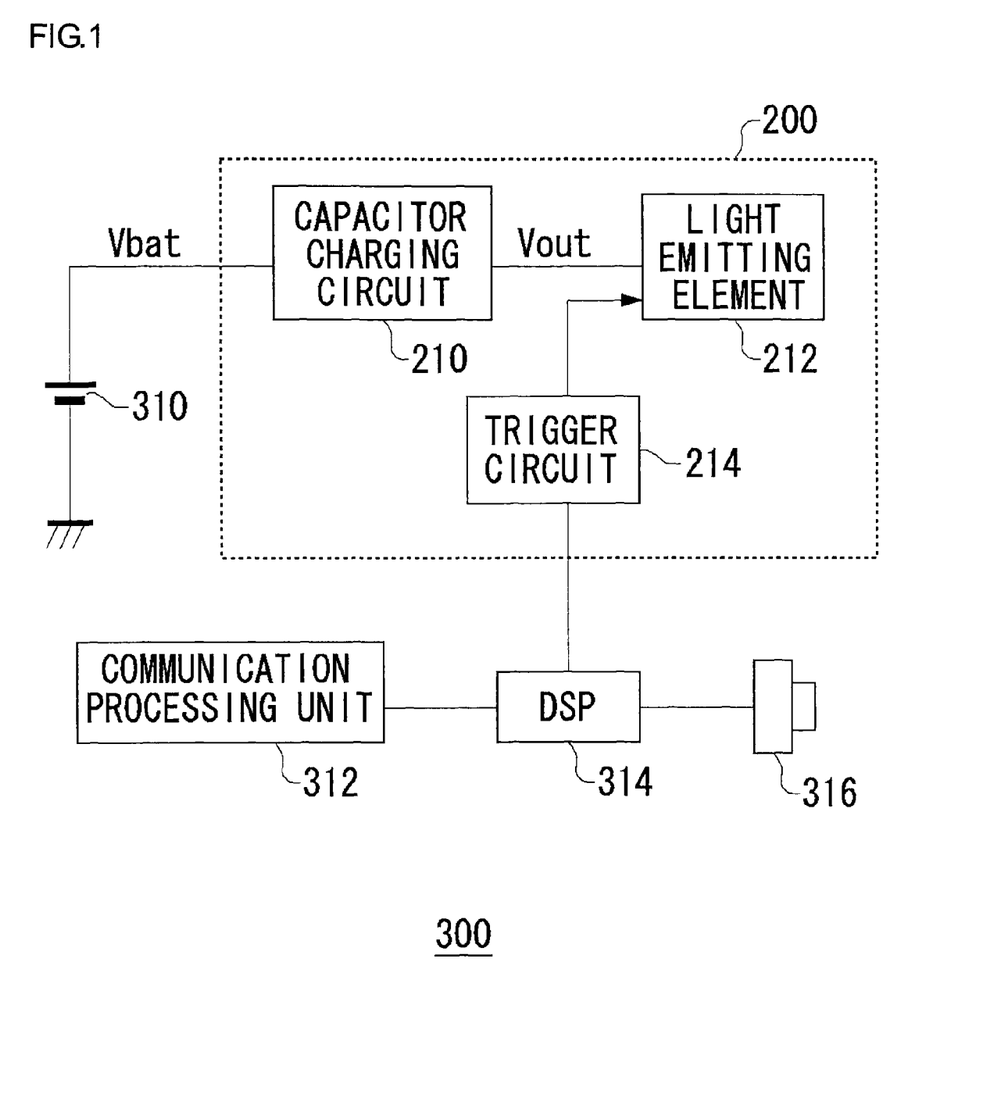
FIG. 1 is a block diagram which shows a configuration of an electronic device mounting a light emitting device according an embodiment.

FIG. 1 is a block diagram which shows a configuration of an electronic device 300 mounting a light emitting device 200 according to an embodiment. The electronic device 300 is a cellular phone terminal mounting a camera including a battery 310, a communication processing unit 312, a DSP (Digital Signal Processor) 314, an image capturing unit 316, and the light emitting device 200.

The battery 310 is a lithium ion battery, for example, and outputs a battery voltage of around 3 to 4 V as a battery voltage Vbat. The DSP 314 is a block for centrally controlling the overall operation of the electronic device 300, and is connected to the communication processing unit 312, the image capturing unit 316, and the light emitting device 200. The communication processing unit 312 includes an antenna, a high-frequency circuit, and so forth, and communicates with a base station. The image capturing unit 316 is an image acquisition device such as a CCD (Charge Coupled Device), a CMOS sensor, or the like. The light emitting device 200 is used as a flash when the image capturing unit 316 acquires an image.

The light emitting device 200 includes a capacitor charging circuit 210, a light emitting element 212, and a trigger circuit 214. A xenon tube or the like is suitably employed as the light emitting element 212. The capacitor charging circuit 210 is a self-exciting DC/DC converter which boosts the battery voltage Vbat supplied from the battery 310, and supplies the driving voltage of around 300 V to the light emitting element 212. The trigger circuit 214 is a circuit which controls the timing of the light emitting operation of the light emitting device 200. The light emitting element 212 performs light emission synchronously with the image acquisition operation of the image capturing unit 316.

Figure 2:
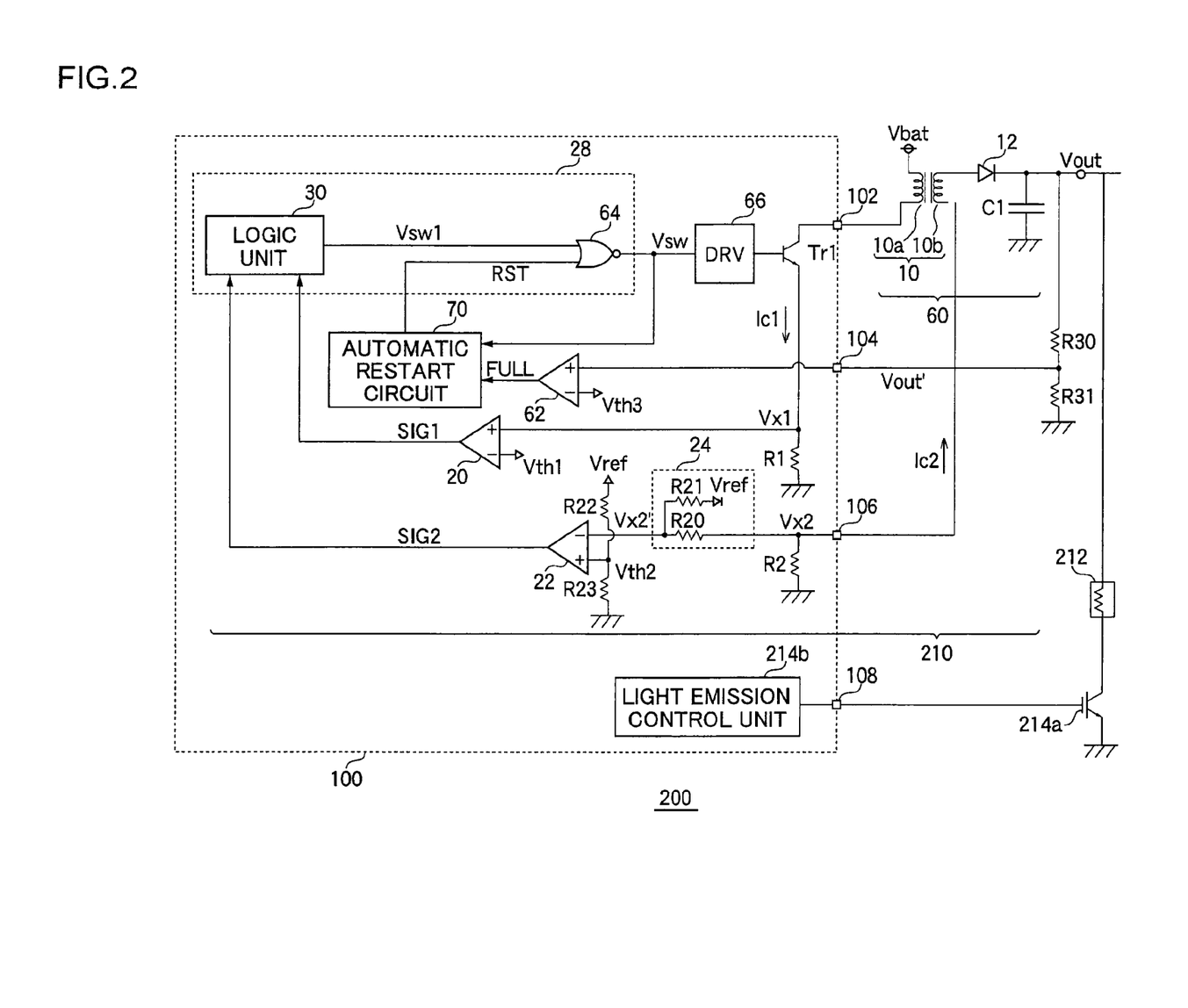
FIG. 2 is a circuit diagram which shows a configuration of the light emitting device.

FIG. 2 is a circuit diagram which shows a configuration of the light emitting device 200. The light emitting device 200 includes the capacitor charging circuit 210, the light emitting element 212, and an IGBT 214a. The capacitor charging circuit 210 outputs the output voltage Vout, which is obtained by boosting the battery voltage Vbat, to the light emitting element 212. The output voltage Vout is divided by resistors R30 and R31. The output voltage Vout' thus divided is input to a voltage detection terminal 104.

The IGBT 214a is provided in series with the light emitting element 212. When the IGBT 214a is turned on, the light emitting element 212 emits light.

The capacitor charging circuit 210 includes a control circuit 100 and an output circuit 60. The output circuit 60 includes a transformer 10, a rectifier diode 12, and an output capacitor C1. The anode of the rectifier diode 12 is connected to one terminal of the secondary coil 10b of the transformer 10. The output capacitor C1 is provided between the cathode of the rectifier diode 12 and the ground terminal.

The battery voltage Vbat is applied to one terminal of the primary coil 10a of the transformer 10. The other terminal thereof is connected to an output terminal 102 of the control circuit 100. Furthermore, one terminal of the secondary coil 10b is connected to a secondary-line detection terminal 106.

The control circuit 100 controls the ON/OFF operation of a switching transistor Tr1 provided on a path connected to the primary coil 10a. The switching transistor Tr1 may be provided as a discrete element externally to the control circuit 100.

In addition to the switching transistor Tr1, the control circuit 100 includes a first resistor R1, a second resistor R2, a first voltage comparator 20, a second voltage comparator 22, a level shift circuit 24, resistors R22 and R23, a switching control unit 28, a driver 66, a full-charge detection circuit 62, and an automatic restart circuit 70.

A light emission control unit 214b generates a light emission control signal SIG20, and outputs the light emission control signal SIG20 to the IGBT 214a connected to a light emission control terminal 108. The light emission operation of the light emitting element 212 is controlled according to the light emission control signal SIG20.

The first resistor R1 is provided on a path for the current (primary current Ic1) that flows through the primary coil 10a. One terminal of the first resistor R1 is grounded, and accordingly, the electric potential at this one terminal is fixed. Specifically, the first resistor R1 is provided between the emitter of the switching transistor Tr1 and the ground terminal.

The first voltage comparator 20 compares the voltage drop that occurs at the first resistor R1, i.e., a first detection voltage Vx1, with a predetermined first threshold voltage Vth1. When Vx1 is greater than Vth1, a first signal SIG1 which indicates the comparison result is set to the high-level state, and when Vx1 is smaller than Vth1, the first signal SIG1 is set to the low-level state. The first voltage comparator 20 compares the primary current Ic1 with a first threshold current Ith1 obtained by Expression Vth1/R1.

The second resistor R2 is provided on a path for the current (secondary current Ic2) that flows through the secondary coil 20b. One terminal of the second resistor R2 is grounded, and accordingly, the electric potential at this one terminal is fixed. The other terminal of the second resistor R2 is connected to the secondary coil 10b via the secondary-line detection terminal 106. Also, the first resistor R1 and the second resistor R2 may be provided externally to the control circuit 100.

The second voltage comparator 22 compares the voltage drop that occurs at the second resistor R2, i.e., a second detection voltage Vx2, with a predetermined second threshold voltage Vth2. The second detection voltage Vx2 is a negative voltage, and accordingly, the voltage obtained by shifting the second detection voltage Vx2 in the positive direction is compared with the threshold voltage.

The level shift circuit 24 includes resistors R20 and R21. The level shift circuit 24 shifts the second detection voltage Vx2 in the positive direction. The second detection voltage Vx2 is input to the inverting input terminal of the second voltage comparator 22 via the resistor R20. Furthermore, a reference voltage Vref is input to the inverting input terminal thereof via the resistor R21. In a case in which the input impedance of the second voltage comparator 22 is sufficiently large, and in a case in which the relation R20=R21 is satisfied, the output voltage Vx2' of the level shift circuit 24 is represented by the Expression; Vx2'=(Vx2+Vref)/2.

The second detection voltage Vx2', which is subjected to level shift processing by the level shift circuit 24, is input to the inverting input terminal of the second voltage comparator 22. Furthermore, the second threshold voltage Vth2, which has been obtained by dividing the reference voltage Vref using the resistors R22 and R23, is input to the non-inverting input terminal of the second voltage comparator 22. In a case in which R22 is equal to R23, Vth2 is equal to Vref/2. The second voltage comparator 22 compares the output voltage Vx2' of the level shift circuit 24 with the predetermined second threshold voltage Vth2. In a case in which Vx2' is smaller than Vth2, i.e., in a case in which Vx2 is smaller than 0, the second voltage comparator 22 outputs a signal (second signal SIG2) at the high level, and in a case in which Vx2' is greater than Vth2, i.e., in a case in which Vx2 is greater than 0, the second voltage comparator 22 outputs a signal (second signal SIG2) at the low level. Strictly, the threshold voltage is set to a value lower than 0 V. The second voltage comparator 22 compares the secondary current Ic2 with a second threshold current Ith2.

The switching control unit 28 includes a logic unit 30 and a NOR gate 64. The first signal SIG1 and the second signal SIG2 are input to the logic unit 30. The logic unit 30 generates a switching signal Vsw1, the level of which is switched according to the first signal SIG1 and the second signal SIG2.

When the first detection voltage Vx1 exceeds the first threshold voltage Vth1, i.e., when the current Ic1 that flows through the primary coil of the transformer 10 reaches the first threshold current Ith1, the logic unit 30 turns off the switching transistor Tr1.

Furthermore, when the second detection voltage Vx2', which is the output of the level shift circuit 24, exceeds the second threshold voltage Vth2, i.e., when the current Ic2, which flows through the secondary coil of the transformer 10, is reduced to the second threshold current Ith2 which is set to approximately 0 A, the logic unit 30 turns on the switching transistor Tr1.

When the primary current Ic1 reaches the first threshold current Ith1, the switching signal Vsw is set to the first level (low level). When the secondary current Ic2 is reduced to the second threshold current Ith2, the switching signal Vsw is set to the second level (high level). The driver 66 switches the ON/OFF state of the switching transistor Tr1 based upon the signal Vsw, which corresponds to the switching signal Vsw1. When the switching signal Vsw1 is at the high level, the switching transistor Tr1 is set to the ON state, and when the switching signal Vsw1 is at the low level, the switching transistor Tr1 is set to the OFF state.

After a predetermined period of time τ elapses after the switching signal Vsw reaches the level at which the switching transistor Tr1 is set to the OFF state, the automatic restart circuit 70 forcibly switches the switching signal Vsw to a level which turns on the switching transistor Tr1. Specifically, the automatic restart circuit 70 outputs a restart signal RST which is switched to the high-level state after the predetermined period of time τ elapses. The predetermined period of time τ is set to a value which is greater than the OFF period necessary for the normal switching operation of the switching transistor Tr1.

The NOR gate 64 outputs the NOR (negative OR) of the switching signal Vsw1 and the reset signal RST as the switching signal Vsw.

The full-charge detection circuit 62 includes a comparator, and compares the voltage Vout', which corresponds to the output voltage Vout of the capacitor charging circuit 210, with a predetermined third threshold voltage Vth3. The full-charge detection circuit 62 outputs a full signal FULL which is set to the high level when Vout is greater than Vth3. When the full signal FULL is set to the high level state, i.e., when the output voltage Vout' is greater than the third threshold voltage Vth3, the automatic restart circuit 70 is set to the inactive state. In the inactive state, the automatic restart circuit 70 does not affect the level of the switching signal Vsw. It should be noted that the full signal FULL is used as a signal which notifies other circuits that the charging operation has been completed.

Figure 3:
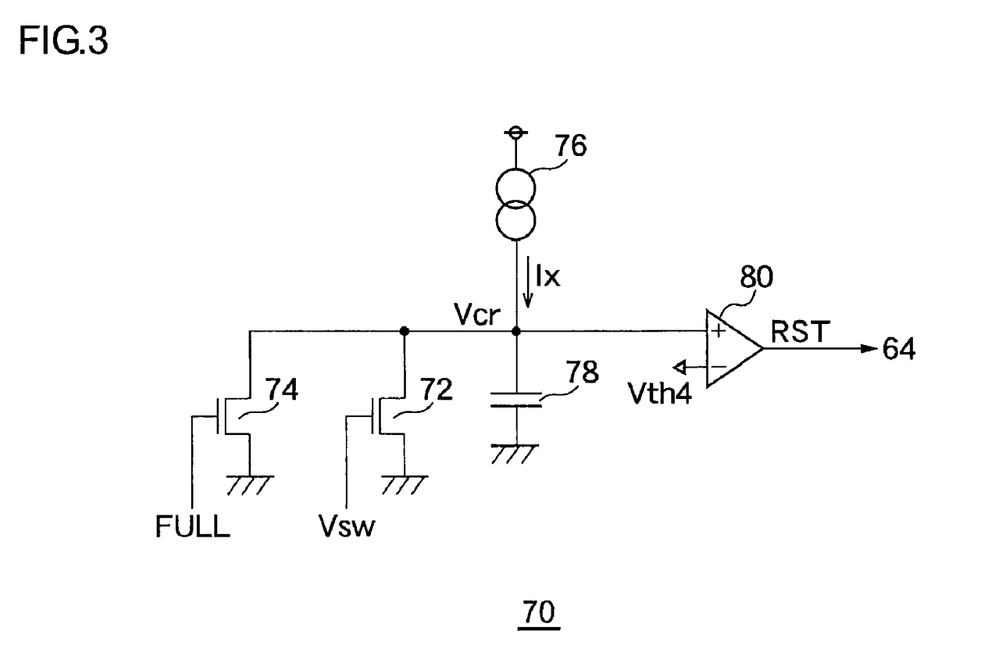
FIG. 3 is a circuit diagram which shows a configuration example of an automatic restart circuit.

FIG. 3 is a circuit diagram which shows a configuration example of the automatic restart circuit 70. The automatic restart circuit 70 is a time constant circuit, and includes a first charging circuit 72, a second charging circuit 74, a current source 76, a capacitor 78, and a comparator 80. One terminal of the capacitor 78 is grounded, and accordingly, the voltage at this one terminal is fixed. The current source 76 supplies the current Ix to the capacitor 78. The current source 76 can be configured using a constant current source or a resistor. The first charging circuit 72 is an N-channel MOSFET. When the switching signal Vsw is set to a level which turns on the switching transistor Tr1, the first charging circuit 72 discharges the capacitor 78. The comparator 80 compares the voltage Vcr at the other terminal of the capacitor 78 with a predetermined fourth threshold voltage Vth4. The second charging circuit 74 is an N-channel MOSFET. When the output voltage Vout' is greater than the predetermined third threshold voltage Vth3, i.e., when the full signal FULL is at the high level, the second charging circuit 74 discharges the capacitor 78.

The voltage Vcr at the capacitor 78 is a time constant voltage which rises with time. The period of time in which the time constant voltage Vcr reaches the fourth threshold voltage Vth4 matches the predetermined period of time τ. The comparator 80 outputs a restart signal RST which is switched to the high-level state after the predetermined period of time τ elapses after the switching signal Vsw is switched to the level (low level) at which the switching transistor Tr1 is set to the OFF state.

When the full signal FULL is at the high level, i.e., when the full signal indicates the fully charged state, the second charging circuit 74 maintains the ON state. Accordingly, the time constant voltage Vcr is fixed to around 0 V, which maintains the restart signal RST at the low level. Accordingly, the restart signal RST does not affect the logical value of the switching voltage Vsw.

Figure 4:
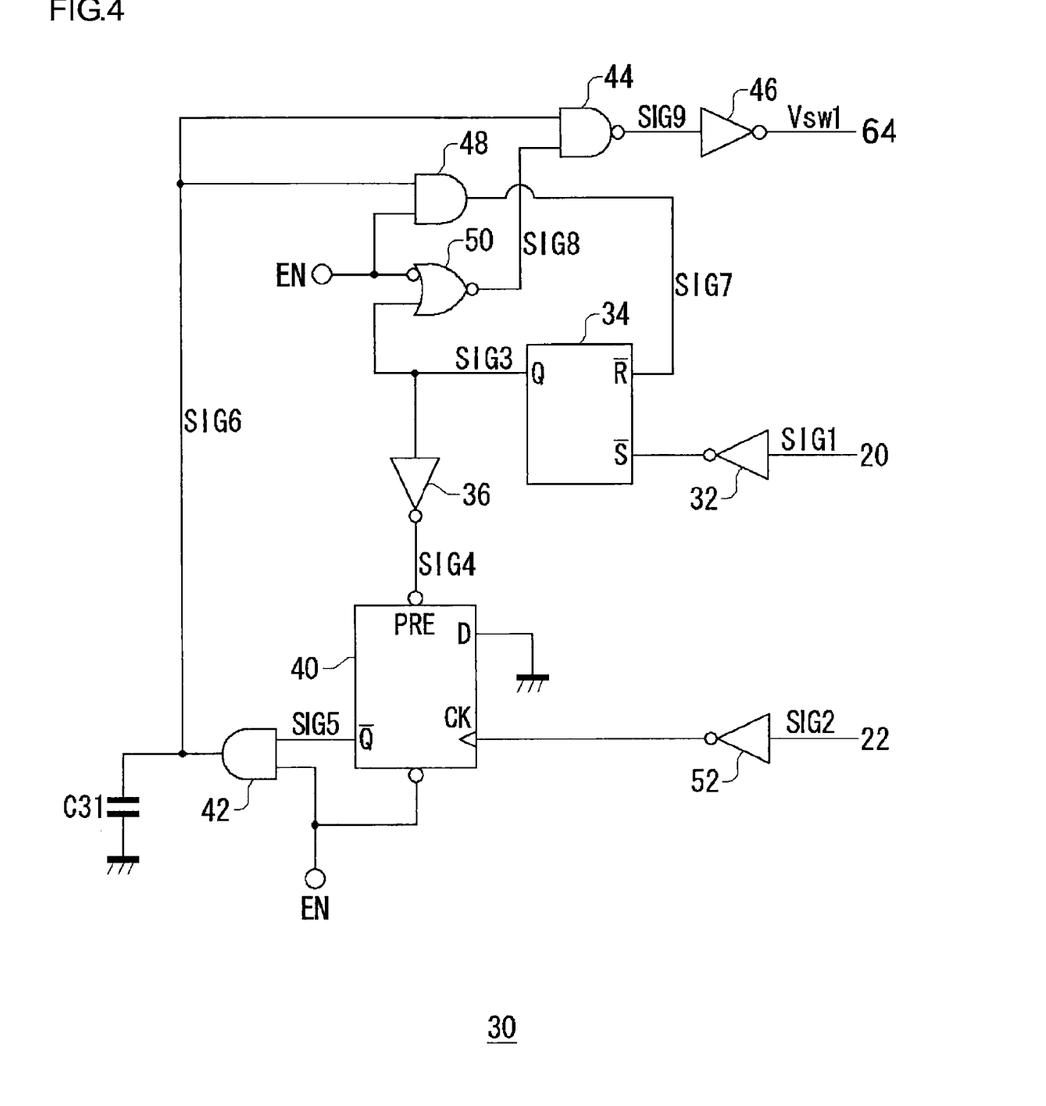
FIG. 4 is a circuit diagram which shows a configuration example of a logic unit.

FIG. 4 is a circuit diagram which shows a configuration example of the logic unit 30.

The output signal SIG1 of the first voltage comparator 20 is inverted by an inverter 32. The output signal of the inverter 32 is input to the set terminal of an RS flip-flop 34. The output signal SIG3 of the RS flip-flop 34 is inverted by an inverter 36. The output signal SIG4 of the inverter 36 is input to the preset terminal of a D flip-flop 40. Furthermore, the output signal SIG3 of the RS flip-flop 34 is input to one of the input terminals of a NOR gate 50. The enable signal EN, which controls the overall ON/OFF operation of the capacitor charging circuit 210, is input to the other input terminal of the NOR gate 50. When the enable signal EN is at the high level, the control circuit 100 drives the switching transistor Tr1 so as to perform the voltage step-up operation. The output signal SIG8 of the NOR gate 50 is input to a NAND gate 44.

The logic unit 30 switches the switching transistor Tr1 to the ON state according to the output signal SIG2 of the second voltage comparator 22. The second signal SIG2 is inverted by the inverter 52, and is input to the clock terminal of the D flip-flop 40. The data terminal of the D flip-flop 40 is grounded, i.e., is fixed at the low level. Furthermore, the enable signal EN is input to the clear terminal of the D flip-flop 40. By inputting the enable signal EN to the clear terminal, such an arrangement allows the control circuit 100 to be initialized each time the voltage step-up operation is started. Also, the output signal SIG4 of the inverter 36 is input to the preset terminal of the D flip-flop 40.

When the signal input to the clock terminal of the D flip-flop 40 is set to the high-level state during a period in which the high-level signals are input to the preset terminal and the clear terminal thereof, the D flip-flop 40 outputs a high level signal as an inverted output signal SIG5. On the other hand, when the signal SIG4, which is input to the preset terminal, is switched from the high level to the low level, the D flip-flop 40 outputs a low level signal as the inverted output signal SIG5.

The inverted output signal SIG5 of the D flip-flop 40 is input to an AND gate 42. The AND gate 42 outputs the AND of the inverted output signal SIG5 of the D flip-flop 40 and the enable signal EN to the NAND gate 44. A capacitor C31 reduces the transition speed of the signal SIG6, which generates a signal delay. The NAND gate 44 outputs the NAND of the output of the NOR gate 50 and the output of the AND gate 42. An inverter 46 inverts the output signal SIG9 of the NAND gate 44. The output signal of the inverter 46 is used as the switching signal Vsw1. The AND gate 48 receives the output signal SIG6 of the AND gate 42 and the enable signal EN as the input signals. The output signal SIG7 of the AND gate 48 is input to the reset terminal of the RS flip-flop 34. The above is the configuration of the logic unit 30.

Figure 5:
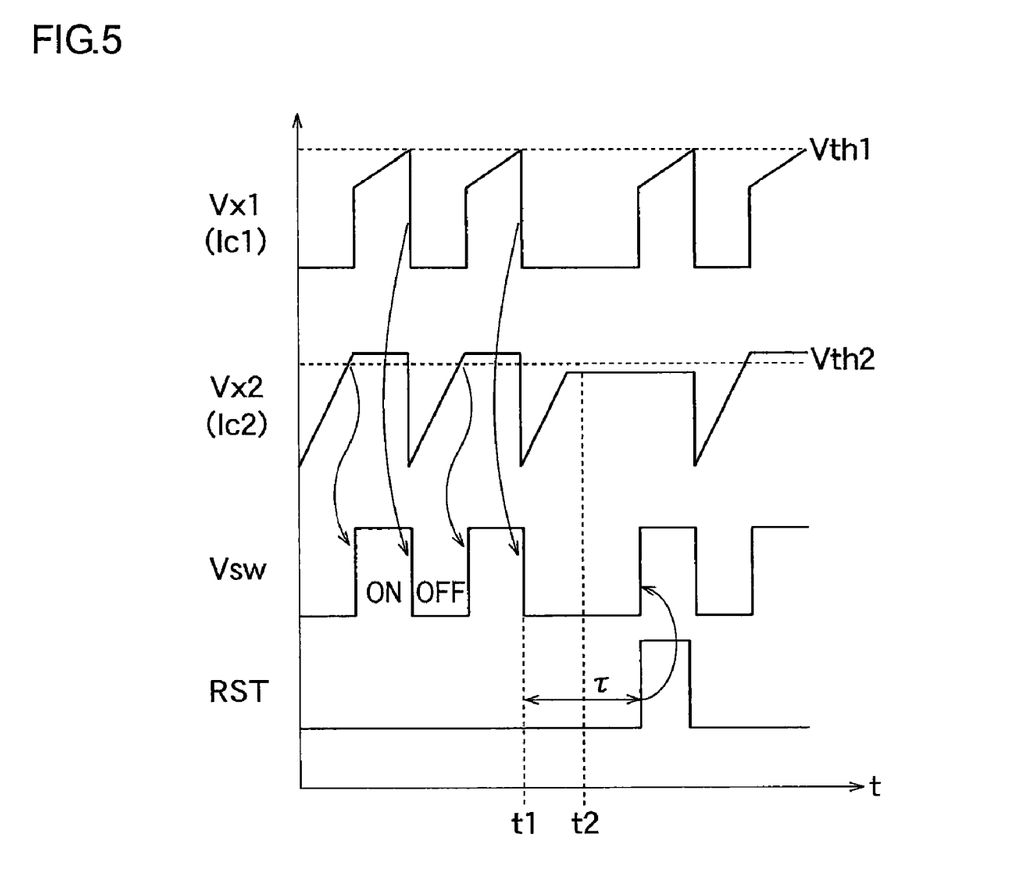
FIG. 5 is a time chart which shows the operation of a capacitor charging circuit shown in FIG. 2.

Next, description will be made regarding the operations of the control circuit 100 and the capacitor charging circuit 210. FIG. 5 is a time chart which shows the operation of the capacitor charging circuit 210 shown in FIG. 2.

When the switching signal Vsw is at the high level, and the switching transistor Tr1 is in the ON state, the current Ic1, which increases with time, flows through the primary coil 10a of the transformer 10. When the primary current Ic1 reaches the first threshold level Ith1, the logic unit 30 switches the switching transistor Tr1 to the OFF state.

When the switching transistor Tr1 is switched to the OFF state, the energy stored in the transformer 10 is transferred to the output capacitor C1 via the rectifier diode 12. In this stage, the current Ic2, which flows through the secondary coil of the transformer 10, is reduced according to the discharge of the energy from the transformer 10. When the secondary current Ic2 drops to the threshold Ith2, the logic unit 30 turns on the switching transistor Tr1.

The function of the automatic restart circuit 70 is shown after the point in time t1 shown in FIG. 5. When the switching transistor Tr1 is switched to the OFF state at the point in time t1, the secondary current Ic2 is reduced. However, in a case in which, due to an unexpected disturbance, the curve of the second detection voltage Vx2 and the curve of the second threshold voltage Vth2 do not intersect, the switching transistor Tr1 does not switch to the ON state at the timing t2 at which it should switch to the ON state in the normal operation. Conventional circuits have a problem in that, in a case in which the curve of the second detection voltage Vx2 and the curve of the second threshold voltage Vth2 do not intersect after the point in time t2, the switching operation of the switching transistor Tr1 is interrupted.

With the embodiment, when the switching transistor Tr1 is switched to the OFF state, the time counting is started. After a predetermined period of time τ elapses, the switching signal Vsw is switched to the high-level state according to the restart signal RST. This forcibly turns on the switching transistor Tr1 regardless of the relation between the second detection voltage Vx2 and the threshold voltage Vth2. As a result, such an arrangement prevents the switching operation from being interrupted.

Furthermore, by providing the full-charge detection circuit 62, such an arrangement prevents the switching operation from being started in the fully charged state in which there is no need to continue the switching operation.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

In the embodiment, the components such as the logic unit 30, the automatic restart circuit 70, etc., are described for exemplary purposes only. For example, N-channel MOSFETs may be replaced by P-channel MOSFETs, NPN bipolar transistors may be replaced by PNP bipolar transistors, latch circuits may be replaced by flip-flops, logical inversion may be made. Also, the embodiment may be configured using a desired circuit which is capable of executing the same functions.

The automatic restart circuit 70 shown in FIG. 3 is configured using a time constant circuit. Also, the automatic restart circuit 70 may be configured using a counter.

The full-charge detection circuit 62 divides the output voltage Vout. Also, the fully charged state may be detected based upon the voltage which occurs at the secondary coil or the primary coil of the transformer 10.

Description has been made in the embodiment regarding an arrangement in which the capacitor charging circuit 210 drives the light emitting element 212. However, the present invention is not restricted to such an arrangement. Also, the capacitor charging circuit 210 may drive various load circuits which require high voltage.

While the preferred embodiments of the present invention have been described using specific terms, such description is for illustrative purposes only, and it is to be understood that changes and variations may be made without departing from the spirit or scope of the appended claims.

What is claimed is:

1. A control circuit which controls the ON/OFF operation of a switching transistor provided on a path to a primary coil of a transformer of a self-exciting capacitor charging circuit, comprising:
a first voltage comparator which compares the voltage drop that occurs at a first resistor provided on a path for a current which flows through the primary coil of the transformer, with a predetermined first threshold voltage;
a second voltage comparator which compares the voltage drop that occurs at a second resistor provided on a path for a current which flows through a secondary coil of the transformer, with a predetermined second threshold voltage;
a switching control unit which generates a switching signal the level of which is switched according to the output signals of the first and second voltage comparators, and which outputs the switching signal thus generated to a control terminal of the switching transistor; and
an automatic restart circuit configured such that, after a predetermined period of time elapses after the switching signal is switched to a level which turns off the switching transistor, the switching signal is forcibly switched to a level which turns on the switching transistor.

2. A control circuit according to claim 1, further including a full-charge detection circuit which compares the output voltage of the capacitor charging circuit with a third threshold voltage, and which is configured such that, in a case in which the output voltage is greater than the third threshold voltage, the automatic restart circuit is set to the inactive state.

3. A control circuit according to claim 1, wherein the automatic restart circuit comprises:
a capacitor with one terminal being set to a fixed voltage;
a current source which supplies a current to the capacitor;
a first charging circuit configured such that, when the switching signal is at a level which turns on the switching transistor, the capacitor is discharged; and
a comparator which compares the voltage at the other terminal of the capacitor with a predetermined fourth threshold voltage,
wherein, according to the output of the comparator, the switching signal is forcibly switched to the level which turns on the switching transistor.

4. A control circuit according to claim 3, wherein the automatic restart circuit further includes a second discharge circuit configured such that, when the output voltage of the capacitor charging circuit is greater than the predetermined third threshold voltage, the capacitor is discharged.

5. A capacitor charging circuit comprising:
an output circuit which includes a transformer, a switching transistor connected to a primary winding of the transformer, and an output capacitor provided to a secondary winding of the transformer, and which performs the ON/OFF operation of the switching transistor to charge the output capacitor; and
a control circuit according to claim 1, which controls the ON/OFF operation of the switching transistor.

6. An electronic device comprising:
a capacitor charging circuit according to claim 5;
an image capturing unit; and
a light emitting element which is driven by the output voltage of the capacitor charging circuit, and which is used as a flash in image acquisition performed by the image capturing unit.

7. A method for controlling the ON/OFF operation of a switching transistor of a self-exciting capacitor charging circuit, comprising:
comparing a primary current that flows through a primary coil of a transformer with a predetermined first threshold value, and switching the switching transistor to the OFF state when the primary current exceeds the first threshold value;
comparing a secondary current that flows through a secondary coil of the transformer with a predetermined second threshold value, and switching the switching transistor to the ON state when the secondary current drops to the second threshold value; and
forcibly switching the switching transistor to the ON state after a predetermined period of time elapses after the switching transistor is switched to the OFF state.

8. A method according to claim 7, wherein the output voltage of the capacitor charging circuit is compared with a predetermined third threshold voltage,
and wherein, when the output voltage is greater than the third threshold voltage, the switching transistor is forcibly switched to the ON state.

* * * * *